United States Patent [19]

Mori

[11] Patent Number: 5,280,950
[45] Date of Patent: Jan. 25, 1994

[54] SAFETY DEVICE FOR STARTING EQUIPMENT

[75] Inventor: Shinji Mori, Aichi, Japan

[73] Assignee: Kabushiki Kaisha Tokai-Rika-Denki-Seisakusho, Aichi, Japan

[21] Appl. No.: 791,190

[22] Filed: Nov. 13, 1991

[30] Foreign Application Priority Data

Nov. 30, 1990 [JP] Japan ............................... 2-130472

[51] Int. Cl.$^5$ ............................................. B60R 21/32
[52] U.S. Cl. .................................... 280/734; 180/282
[58] Field of Search .................. 280/734, 735, 806; 180/282; 200/61.45 R, 61.55

[56] References Cited

U.S. PATENT DOCUMENTS

| 5,080,394 | 1/1992 | Mori et al. ...................... 280/734 |
| 5,092,628 | 3/1992 | Tamura et al. ................... 280/734 |

FOREIGN PATENT DOCUMENTS

2115056  9/1990  Japan .

Primary Examiner—Margaret A. Focarino
Assistant Examiner—Paul Dickson
Attorney, Agent, or Firm—Sixbey, Friedman, Leedom & Ferguson

[57] ABSTRACT

A safety device for preventing unexpected operation during installation of an ignition device. The ignition device includes a drive shaft which is movable while following up movement of an inertial mass when a vehicle rapidly decelerates and an ignition member is urged towards a detonator. A lock plate is provided so as to be movable between a first position where the lock plate contacts the drive shaft at a position on the side opposite to the inertial mass via the drive shaft, such that the drive shaft is inhibited from following up movement of the inertial mass when the ignition device is installed, and a second position where the lock plate is released from the drive shaft. The inertial mass, which serves as an acceleration sensor, contacts the drive shaft to activate the ignition member, and the drive shaft is disposed to be movable while following up the inertial movement of the inertial mass. A presser shaft contacts the lock plate and rotates about the axis thereof, thereby displacing the lock plate from the first position to the second position to release the drive shaft after installation of the ignition device. Thus, when the inertial mass moves inertially when the vehicle rapidly decelerates, the drive shaft is moved while following up the movement of the inertial mass. Accordingly, the ignition member is moved toward and collides with the detonator, thereby igniting the detonator.

21 Claims, 5 Drawing Sheets

SAFETY DEVICE FOR STARTING EQUIPMENT

BACKGROUND OF THE INVENTION

1. Field of the Invention

The present invention relates to a safety device which is suitable for use in starting equipment activated when a vehicle rapidly decelerates, and which is used to enable the starting equipment to be activated and deactivated.

2. Description of the Related Art

As starting equipment activated when a vehicle rapidly decelerates, one used for an air bag apparatus, for example, is known. In this type of starting apparatus, when each of inertial masses is moved inertially upon rapid deceleration of the vehicle, each of ignition pins is moved by an urging force to collide with a detonator, thereby producing a large quantity of gases, with the result that a bag is expanded by the gases thus produced. In addition, one end of an elongated drive shaft extending in the axial direction thereof is brought into contact with a part of the circumferential surface of the inertial mass, whereas the other end thereof extending in the axial direction is brought into contact with a bias pin pressed and urged by each of compression coiled springs, thereby restricting the inertial movement of each inertial mass. Each of the ignition pins is held in engagement with an axially-extending intermediate portion of the drive shaft. The drive shaft is rotatably supported by a vehicle body at the intermediate portion thereof.

This type of starting equipment is provided with a safety device for reliably maintaining the starting equipment at a deactivated state until the air bag apparatus is mounted on a vehicle so as to enable an occupant to ride in his vehicle, and for reliably enabling the starting equipment to be activated in a state in which the occupant can ride in the vehicle. The safety device comprises lock pins and coiled springs. Each of the lock pins is inserted into and disposed in the central part of the starting equipment, and is moved by the force pushing toward the occupant. In addition, a ring-shaped groove is defined in an end of each lock pin on the occupant side, and a hook portion extending in the radial dimension of a coil of each coiled spring is held in engagement with the groove. In this condition, the hook portion of each of the coiled springs extends in the direction normal to each lock pin. The drive shaft is disposed in the leading end of the hook portion so as to be brought into contact with a corresponding portion opposite to a portion of the drive shaft, which is brought into contact with each of balls.

Thus, when each of the lock pins is not pushed forward, the hook portion of each spring serves to inhibit the inertial movement of each ball with the help of the drive shaft, thereby deactivating the starting equipment. On the other hand, when each of the lock pins is pushed forward, the hook portion of each spring is released from the groove defined in each lock pin, so that the hook portion is moved within the plane perpendicular to the axis of each lock pin. As a result, the hook portion and the drive shaft do not interfere with each other, and hence each of the balls can be moved inertially. In other words, the starting equipment is brought into a ready condition.

In this type of safety device, however, pushing force applied in the axial direction of each of the lock pins must be reliably transmitted to the hook portion of each of the springs, which are disposed in the direction normal to each lock pin. More specifically, the direction to input the pushing force must reliably be changed from the axial direction of each lock pin to the direction normal to the lock pin. Thus, the safety device has the problem that when the change in the direction to input the pushing force is not reliably carried out, the accuracy of dimensions and assembly required for respective components such as lock pins, coiled springs, drive shafts and the like must be made more severe because of the possibility of the changeover of either the activation or deactivation of the starting equipment not being suitably carried out.

SUMMARY OF THE INVENTION

With the foregoing in view, it is an object of the present invention to provide a safety device for starting equipment, which is capable of reliably activating and deactivating the starting equipment and making less severe the dimensional accuracy of respective components or the like.

According to one aspect of the present invention, there is provided a safety device suitable for use in starting equipment having follow-up displacing means activated to follow up the inertial movement of each of inertial masses when a vehicle rapidly decelerates so as to displace each ignition member toward a detonator, the safety device comprising restricting means disposed so as to be linearly movable along a line segment connecting a first position and a second position, the restricting means being brought into contact with the follow-up displacing means when the restricting means is placed in the first position, thereby inhibiting the follow-up displacing means from being displaced in the follow-up direction, whereas the restricting means being released from being brought into contact with the follow-up displacing means when the restricting means is placed in the second position, thereby enabling the follow-up displacing means to move in the follow-up direction. According to the above-described construction of the present invention, when the restricting means is placed in the first position, the restricting means is brought into contact with the follow-up displacing means, thereby inhibiting the follow-up displacing means from following up each inertial mass. Therefore, each of the inertial masses cannot be moved, and hence each of the ignition members is no longer displaced toward the detonator. Thus, the safety of processes such as an assembling process of an occupant protection system with the starting equipment into the vehicle and the like, can be ensured because the starting equipment is deactivated. Then, when the restricting means is linearly moved in relation to the follow-up displacing means from the first position to the second position, the restricting means is withdrawn from the position of contact with the follow-up displacing means, thereby allowing the follow-up displacing means to follow up each of the inertial masses. Therefore, the starting equipment in this condition can be activated.

When the starting equipment is ready for operation and subjected to the normal running state of a vehicle, the acceleration exerted on each of the inertial masses is reduced. Hence, each inertial mass is not moved inertially, and the momentum of each is slight. Therefore, the follow-up displacing means does not follow up each of the inertial masses. Thus, the detonator is held in a non-ignited state because each of the ignition members is not displaced toward the detonator. However, each of the inertial masses is moved inertially when the vehicle rapidly decelerates. Thereafter, the follow-up displacing means is moved to follow up each of the inertial masses Accordingly, each of the ignition members is displaced toward the detonator so as to collide with the detonator, thereby igniting the detonator. As a result, the occupant protection system is activated to protect the occupant from impact occurring when the vehicle rapidly decelerates. As described above, the inhibition of the follow-up displacing means from following up each of the inertial masses can also be allowed by simply displacing the restricting means between the first and second positions. The direction in which force for displacing the restricting means is transmitted may be only one direction. It is therefore unnecessary to divide such a force transfer direction into plural directions, and hence the accuracy of dimensions of the respective components can be made proportionally less severe.

The above and other objects, features and advantages of the present invention will become apparent from the following description and the appended claims taken in conjunction with the accompanying drawings in which a preferred embodiment of the present invention is shown by way of illustrative example.

DETAILED DESCRIPTION OF THE PREFERRED EMBODIMENTS

Figure 2:
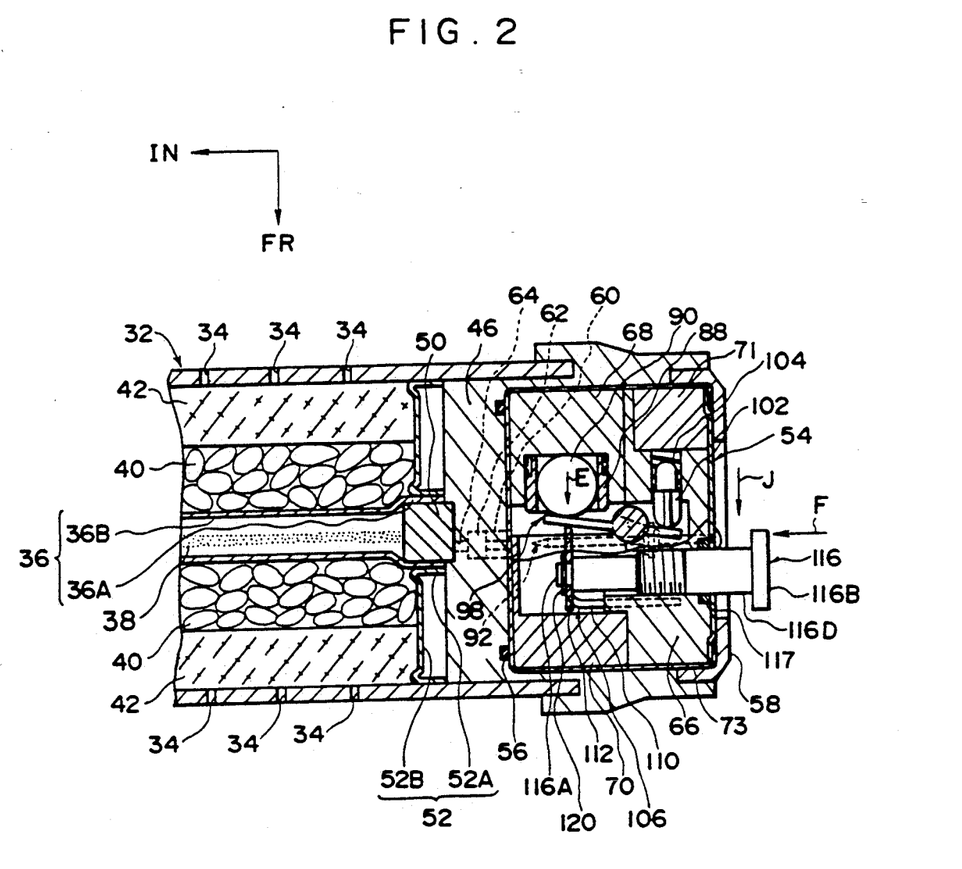
FIG. 2 is a cross-sectional view showing an inflator in which the starting equipment shown in FIG. 1 is incorporated.
Figure 3:
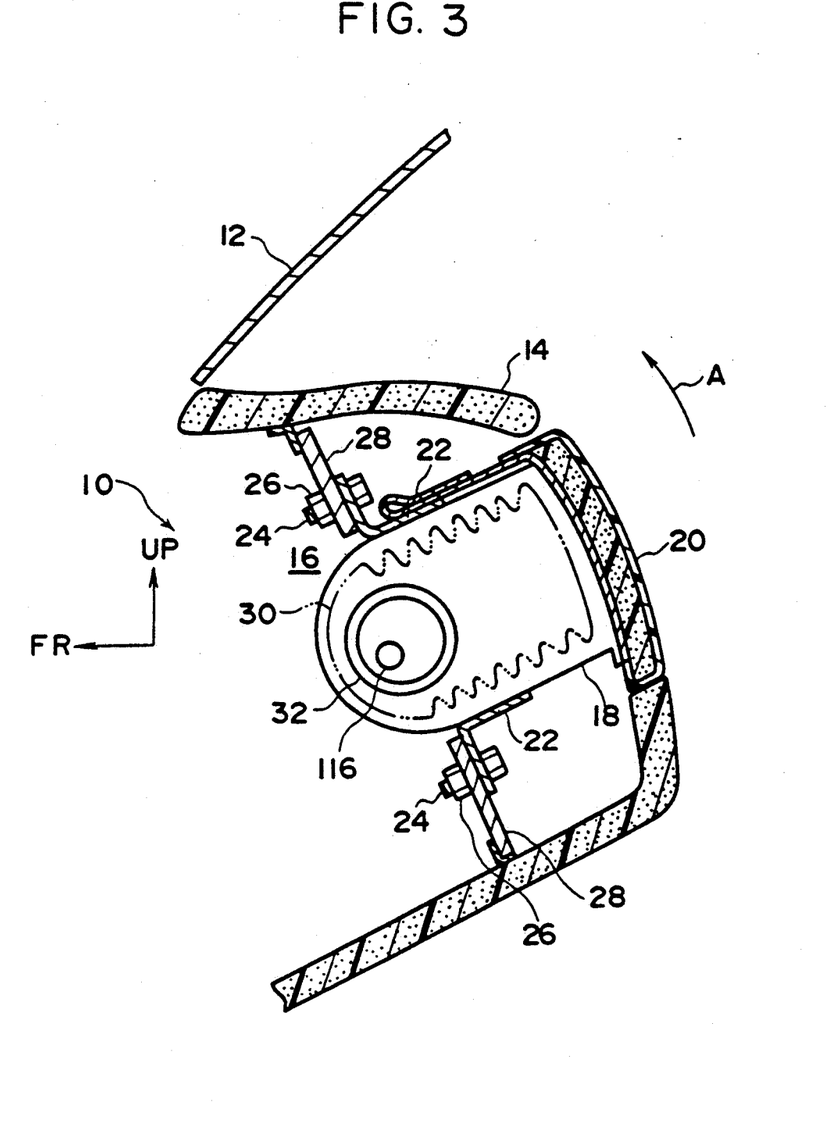
FIG. 3 is a side view, as viewed from a transverse direction of a vehicle, showing an air bag apparatus for a passenger seat, in which the inflator shown in FIG. 2 is incorporated.

FIG. 3 shows an air bag apparatus for a passenger seat (hereinafter referred to as an "air bag apparatus for a P seat") 10, according to one embodiment of the present invention. Incidentally, the arrows FR, UP and IN, suitably shown in FIGS. 1 through 5, indicate the frontal direction of a vehicle, the upper direction of the vehicle, and the interior direction of the vehicle respectively.

An instrument panel 14 is disposed in a lower portion of a front glass 12 as viewed in the lower direction of the vehicle. The instrument panel 14 has an opening 16 defined therein, in which the air bag apparatus 10 for the P seat is accommodated.

The air bag apparatus 10 has an air bag case 18 and an air bag cover 20. The air bag case 18 is shaped in the form of a box whose end face (the face toward the front of the vehicle) on the side opposite the side of an occupant is shaped in the form of a closed and curved surface. L-shaped flanges 22, having cross sections curved at right angles with respect to the longitudinal directions thereof, are respectively mounted on surfaces of the air bag case 18, which are defined substantially in the upper and lower directions of the vehicle. The air bag case 18 is mounted via the flanges 22 on inpanel reinforcements 28 by bolts 24 and nuts 26.

The air bag cover 20 is mounted on the surface of the air bag case 18 in the upper direction of the vehicle by an unillustrated jointing means and is openable. When the air bag cover 20 is mounted on the air bag case 18, the air bag cover 20 serves to close the opening 16 and is located in an opposing relationship to the passenger's seat. When a bag 30 held within the air bag case 18 in a folded state is expanded when the vehicle rapidly decelerates, the air bag cover 20 is pressed so as to be unfolded in the direction indicated by the arrow A in FIG. 3.

As shown in FIG. 2, the air bag case 18 has a cylindrical inflator 32 disposed therein. The inflator 32 has one end extending in the axial direction thereof, which is closed, and the other end extending in the axial direction thereof, which is opened. The inflator 32 has a plurality of gas holes 34 defined in two rows in the peripheral surface thereof along the axial direction thereof and defined in respective opposite ends in the radial direction of the inflator 32. The gas holes 34 are in pairs.

The inflator 32 has an annular detonating tube 36 disposed in the central part thereof. The detonating tube 36 has a base end portion 36A formed on the opening side of the inflator 32, and an annular portion 36B which extends along the axial dimension of the inflator 32 after the diameter of the detonating tube 36 is reduced from the base end portion 36A. The annular portion 36B is charged with an explosion inducing agent 38.

The inflator 32 is filled with gas generating materials 40 disposed on the outer peripheral wall of the annular portion 36B of the detonating tube 36. Further, a plurality of kinds of filters 42 are disposed on the outer peripheral portion of the gas generating materials 40. The filters 42 serve to remove splinters produced when the gas generating materials 40 are subjected to combustion and serve to cool a high temperature gas produced at that time.

A chamber 46, in which cylindrical starting equipment 54 to be described later is incorporated, is fitted in the opening of the inflator 32 at a desired angle relative to the inflator 32. Thereafter, a portion of the chamber 46 to be fitted therein is welded and hence sealed. The positioning of the portion referred to above is carried out in such a manner that the gas holes 34 of the inflator 32 intersect at substantially right angles to the wall portion of the air bag case 18.

The base end portion 36A of the detonating tube 36 is disposed in the central part of an end face of the chamber 46 on the inflator 32 side. A cylindrical explosion inducing agent 50 is inserted into the base end portion 36A of the detonating tube 36 in a state in which a part of the explosion inducing agent 50 is fitted in the chamber 46.

In addition, there is disposed, on the outer peripheral wall of the base end portion 36A of the detonating tube 36, a retainer 52 which extends in the radial direction from the base end portion 36A and is shaped substantially in the form of a disc. The retainer 52 comprises a cylindrical boss 52A formed in the central part thereof, and a support portion 52B which extends in the radial direction from the boss 52A and whose peripheral edge is bent along the inner peripheral surface of the inflator 32. The base end portion 36A of the detonating tube 36 is inserted into and elastically supported by the boss 52A. The outer peripheral surface of the support portion 52B is pressed and held against the inner peripheral surface of the inflator 32 by a resilient force of the support portion 52B.

The starting equipment 54 is accommodated in the chamber 46 coaxially with the inflator 32. An O-ring 56 is mounted on an end face of the starting equipment 54 on the inflator 32 side so as to seal the space between the chamber 46 and the outer peripheral surface of the starting equipment 54. Thus, the gas produced when the vehicle rapidly decelerates can be prevented from leaking outside the air bag apparatus 10. In addition, lowering of the internal pressure in the bag 30 can also be prevented. A support ring 58 is fitted on the other end face of the starting equipment 54, which is opposite the side where the O-ring 56 is provided, thereby fixedly mounting the starting equipment 54 in the chamber 46.

A pair of cylindrical protrusions 60 are formed on both sides of the starting equipment 54 with the axis thereof interposed therebetween at the one end of the starting equipment 54 on the inflator 32 side (only one of the protrusions 60 is shown in FIG. 2). Detonators 62 are respectively mounted on end faces of the protrusions 60 on the inflator 32 side. The respective detonators 62 communicate with the explosion inducing agent 50 through a communicating passage 64.

Figure 1:
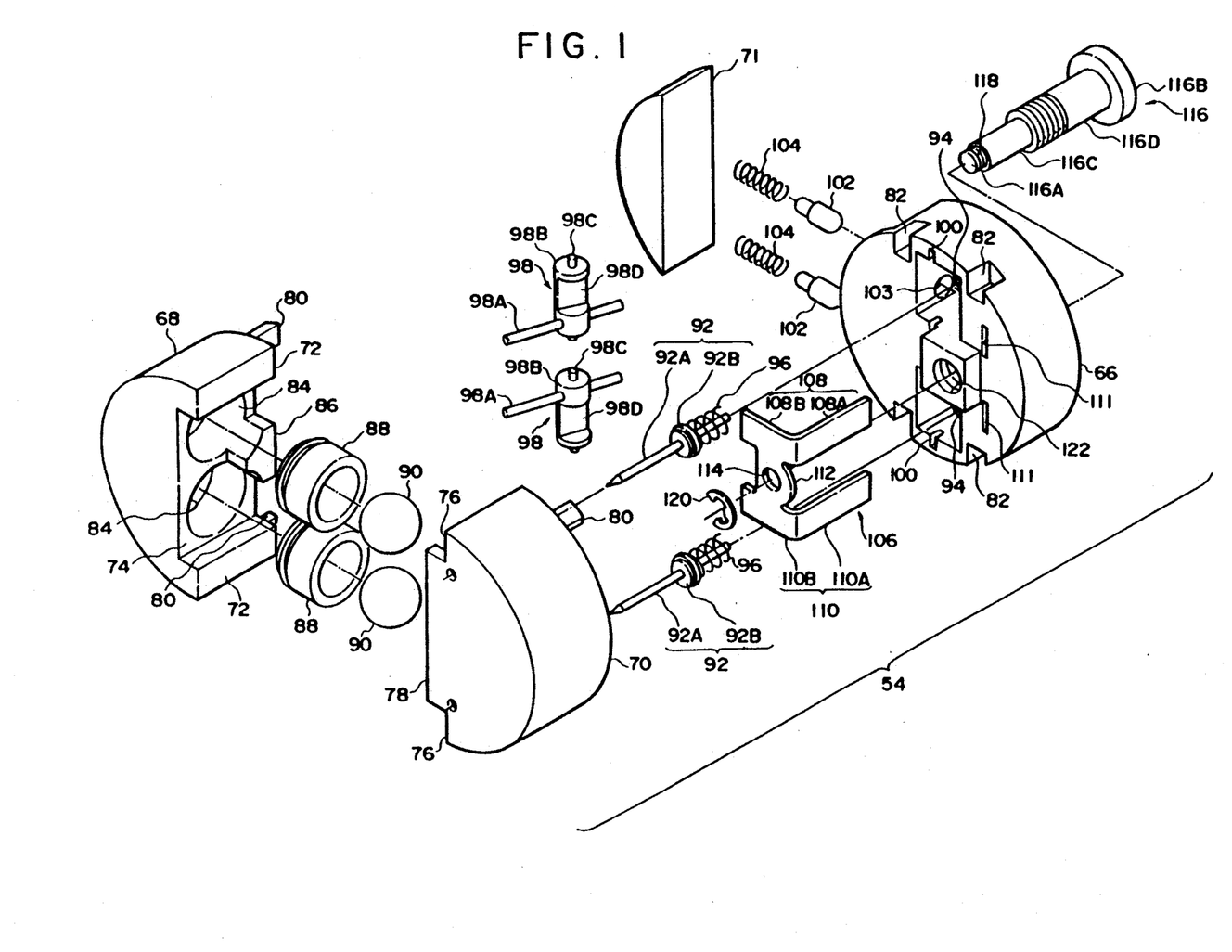
FIG. 1 is an exploded perspective view showing starting equipment to which a safety device according to one embodiment of the present invention is applied.

As shown in FIGS. 1 and 2, the starting equipment 54 includes an upper body 66 shaped substantially in the form of a cylinder, a first lower body 68 shaped substantially in the form of a semicylinder, a second lower body 70 and a cap 71 shaped substantially in the form of a semicylinder as viewed in the axial direction of the starting equipment 54. A cover 73 is fitted o an arrangement comprising the upper body 66, the first lower body 68, the second lower body 70 and the cap 71 which have mutually been combined.

There is defined in a rectangular side portion of the first lower body 68, a rectangular parallelepiped concave portion 74 in such a manner that a pair of rectangular parallelepiped projections 72 is left at both ends of the first lower body 68. The projections 72 are fitted in a pair of rectangular parallelepiped cutaway portions 76 defined in the second lower body 70. In addition, a rectangular parallelepiped convex portion 78 of the second lower body 70 is held in engagement with the concave portion 74. Furthermore, four tongues 80 are formed on one of the end faces extending in the axial direction of a combination of the first lower body 68 and the second lower body 70 which are fitted in each other. The four tongues 80 are fitted respectively in four cut-away portions 82 defined in one of the end faces extending in the axial direction of the upper body 66.

A pair of cylinder holders 84 is defined in the concave portion 74 of the first lower body 68. A support bracket 86 having the shape obtained by cutting away each of the parallelepiped corners thereof along the radius of curvature of each of the cylinder holders 84, is formed integrally with each of the cylinder holders 84 in a position where the respective cylinder holders 84 are adjacent to each other. The respective cylinder holders 84 accommodate a pair of cylinders 88 therein. There are accommodated in the respective cylinders 88, balls 90 as inertial masses which are moved inertially in the direction indicated by the arrow E in FIG. 2 when the vehicle rapidly decelerates In addition, a pair of shaft-shaped ignition pins 92, serving as ignition members, is disposed within the starting equipment 54 in such a manner as to intersect, at a right angle, the direction in which the balls 90 are moved inertially. Each of the ignition pins 92 has a shaft portion 92A and a disc-shaped collar portion 92B formed integrally with the shaft portion 92A near an axially-extending intermediate portion of the shaft portion 92A. The shaft portions 92A are respectively fit loosely in compression coiled springs 96 inserted into a pair of cylindrical spring support portions 94 mounted on the upper body 66. Therefore, the compression springs 96 are pressed against the ignition pins 92 and urged in the direction indicated by the arrow F in FIG. 2.

Between the ignition pins 92 and the balls 90, there are disposed drive shafts 98 as triggering portions. Each of the drive shafts 98 has a shaft portion 98A and a cylindrical engagement portion 98B formed integrally with the shaft portion 98A in such a manner as to be perpendicular to the shaft portion 98A at an axially-extending intermediate portion of the shaft portion 98A. A pair of support shafts 98C projects from both axially-extending ends of each of the engagement portions 98B. The support shafts 98C are supported on a pair of cutaway portions 100 defined in one of the end faces extending in the axial direction of the upper body 66. In addition, each of the collar portions 92B of the ignition pins 92 is held in engagement with each of the engagement portions 98B. Furthermore, recesses 98D are defined in axially-extending intermediate portions of the engagement portions 98B respectively so as to avoid inhibiting the movement of each ignition pin 92.

Each of the balls 90 is brought into contact with one of the ends of each of the shaft portions 98A of the drive shafts 98. In addition, each bias pin 102 is brought into contact with the other end of each of the shaft portions 98A. The bias pins 102 are held in respective cylindrical through holes 103 defined in the upper body 66 along the direction perpendicular to the axial dimension of the upper body 66. Each of the bias pins 102 has one end which is pressed by compression coiled springs 104 held against a rectangular flat face of the cap 71 and which is urged in the direction indicated by the arrow J in FIG. 2. In addition, the bias pins 102 respectively restrict the inertial movement of the balls 90 by the shaft portions 98A of the drive shafts 98.

There is disposed within the starting equipment 54, a lock plate 106, serving as a lock member, which extends in the direction in which the balls 90 are inertially moved. The lock plate 106 has a pair of lock portions 108, 110. Each of the lock portions 108, 110 is formed in such a manner that a rectangular plate is bent in the same direction in a position near a longitudinally-extending intermediate portion of each lock portion to have an L-shape. The lock portions 108, 110 respectively comprise a sliding portion 108A and a contact portion 108B having a long side and a short side respectively, and a sliding portion 110A and a contact portion 110B having a long side and a short side respectively The paired sliding portions 108A, 110A are disposed substantially parallel to the shaft portions 98A of the drive shafts 98. In addition, the sliding portions 108A, 110A are slidably inserted into a pair of rectangular slits 111 defined in the upper body 66 so as to inhibit rotation of the lock plate 106 when the lock bolt 116 is rotated. On the other hand, the contact portions 108B, 110B are connected to each other by a support portion 112 at a longitudinally-extending intermediate portion of each of the contact portions 108B, 110B.

The support portion 112 is formed by projecting each of the sliding portions 108A, 110A in the form of a circular arc. In addition, the support portion 112 has a circular hole 114 defined centrally therein. The leading end 116A of a lock bolt 116, which extends in the axial dimension thereof, extends through the circular hole 114. The lock bolt 116 is disposed in such a way that the longitudinal axis thereof is parallel to the paired sliding portions 108A, 110A of the lock plate 106. Between the leading end 116A of the lock bolt 116 and a head 116B thereof, there is formed a cylindrical support portion 116C of the lock bolt 116 and an intermediate portion 116D located on the side of the head 116B and having a diameter larger than that of the support portion 116C. A male screw is defined on the half of the peripheral surface of the intermediate portion 116D on the leading end 116A side. An O-ring 117 (see FIG. 2) is fitted on the remaining half of the peripheral surface thereof on the head 116B side so as to seal the area between the lock bolt 116 and the inside of the starting equipment 54.

A groove 118 is defined on the peripheral surface of the leading end 116A of the lock bolt 116. An E-ring 120 is fitted in the groove 118 of the leading end 116A so as to be held in engagement therewith in a state in which the lock plate 106 is placed on the surface of the support portion 116C on the leading end 116A side. The male screw defined in the intermediate portion 116D of the lock bolt 116 threadedly engages a female screw defined in a lock bolt insertion portion 122 which is defined in the upper body 66. Therefore, the lock plate 106 is moved in such a way as to follow up the axial displacement of the lock bolt 116 Incidentally, an unillustrated detent is mounted on the lock bolt 116 to keep a predetermined position of the lock plate 106 after installation of the ignition device so as to prevent the lock bolt 116 from rotation in a reverse direction thereof, by vibrations which occur in the vehicle, in the direction opposite to that in which it threadedly engages the lock bolt insertion portion 122. A safety device comprises the lock plate 106, the lock bolt 116 which is rotatably engaged in the lock bolt insertion portion 122 of the upper body 66, the E-ring 120 which is fitted at the leading end 116A of the lock bolt 116 to secure the lock plate 106 and the slits 111 of the upper body 66 into which the sliding portion 108A, 110A of the lock plate 106 are respectively, slidably inserted to inhibit the lock plate 106 from rotating when the lock bolt 116 is rotated.

Figure 4:
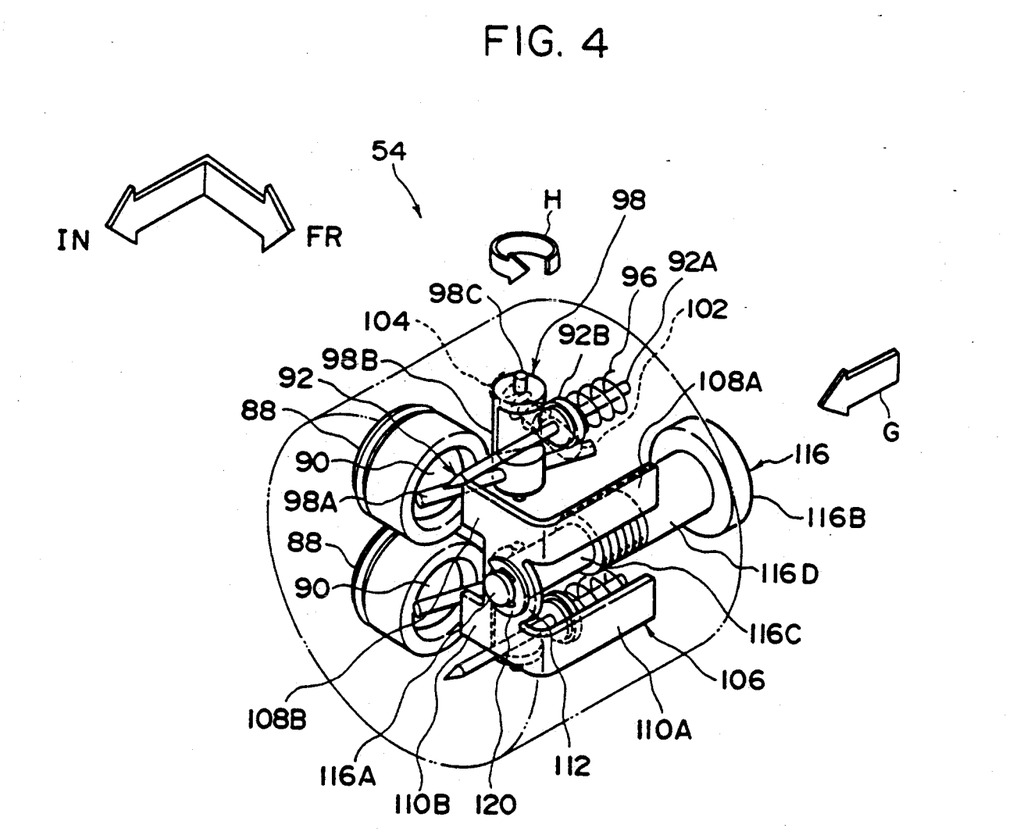
FIG. 4 is a perspective view illustrating the starting equipment shown in FIG. 1 which is in a deactivated state.

As shown in FIG. 4, when the lock bolt 116 is threadedly engaged with the lock bolt insertion portion 122 by a predetermined amount in the direction indicated by the arrow G in FIG. 4, the contact portions 108B, 110B of the lock portions 108, 110 of the lock plate 106 are brought into contact with respectively corresponding portions of the shaft portions 98A of the drive shafts 98, which are opposite to the balls 90. Thus, if such a condition is continued, then the drive shafts 98 are inhibited from being rotated in the direction indicated by the arrow H in FIG. 4. The position of the lock plate 106 at this time shows a first position of the lock member.

Figure 5:
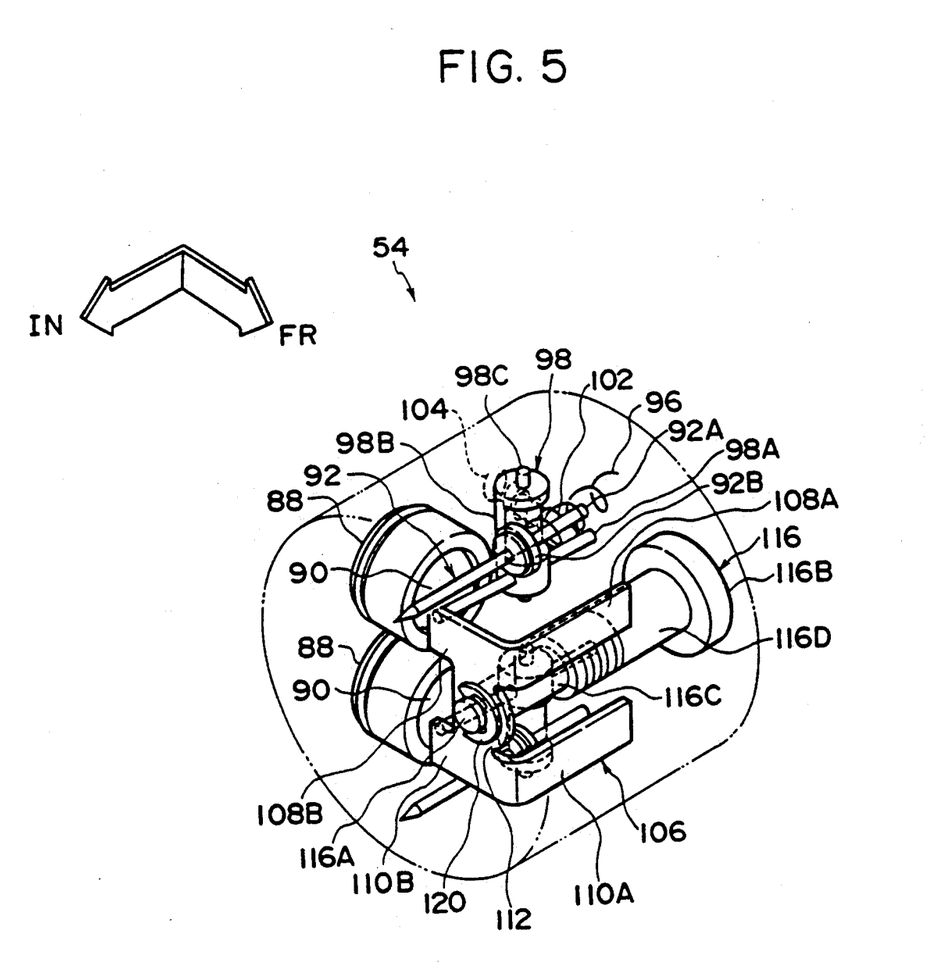
FIG. 5 is a perspective view showing the starting equipment of FIG. 1 which is activated at the time that the vehicle rapidly decelerates, the view corresponding to FIG. 4.

As illustrated in FIG. 5, when the lock bolt 116 is fully threadedly engaged with the lock bolt insertion portion 122 in the direction indicated by the arrow G in FIG. 4, the contact portions 108B, 110B of the lock portions 108, 110 of the lock plate 106 are slid to reach positions spaced away from axially-extending leading ends of the shaft portions 98A of the drive shafts 98. Thus, in this condition the drive shafts 98 are allowed to be rotated in the direction indicated by the arrow H in FIG. 4. The position of the lock plate 106 at this time shows a second position of the lock member. Incidentally, FIG. 5 shows the starting equipment 54 in a state immediately after the balls 90 are inertially moved when the vehicle rapidly decelerates and the collar portions 92B of the ignition pins 92 are released from the engagement portions 98B of the drive shafts 98.

The operation of the present embodiment will now be described below.

When the air bag apparatus 10 for the P seat is not yet mounted on the instrument panel 14, the contact portions 108B, 110B of the lock portions 108, 110 of the lock plate 106 are first brought into contact with the axially-extending leading ends of the shaft portions 98A of the drive shafts 98 respectively as shown in FIG. 4. Therefore, the drive shafts 98 cannot be rotated about the support shafts 98C in the direction indicated by the arrow H in FIG. 4. Thus, the starting equipment 54 is deactivated in this condition.

In this condition, a process for mounting the air bag apparatus 10 on the instrument panel 14 is carried out. After completion of the mounting process, a process for enabling the starting equipment 54 to be activated is performed by using an unillustrated jig. More specifically, the jig is used to rotate the head 116B of the lock bolt 116, thereby causing the lock bolt 116 to threadedly engage the lock bolt insertion portion 122 in the direction indicated by the arrow G in FIG. 4 until the lock bolt 116 is shifted from the first position to the second position. Thus, the lock plate 106 is slid substantially parallel to the shaft portions 98A of the drive shafts 98, so that the contact portions 108B, 110B of the lock portions 108, 110 are further spaced from the leading ends of the shaft portions 98A of the drive shafts 98. As a result, the contact portions 108B, 110B and the leading ends of the shaft portions 98A do not interfere with one another. In this condition, the starting equipment 54 can be activated, thereby enabling the occupant to ride in his vehicle.

The balls 90 are not moved inertially in this condition and at the time of normal running of the vehicle. In addition, each of the ignition pins 92 is not displaced in the direction indicated by the arrow F in FIG. 2 by the urging force of each of the compression springs 96 because the quantity of the inertial movement is extremely small. Thus, the starting equipment 54 is no longer activated, and the vehicle is subjected to a normal running state.

When the vehicle rapidly decelerates from this condition, the balls 90 are greatly moved inertially in the direction indicated by the arrow E in FIG. 2. Therefore, the drive shafts 98 are rotated in the direction indicated by the arrow H in FIG. 4 about the support shafts 98C, thereby releasing the collar portions 92B of the ignition pins 92 from engagement with the engagement portions 98B of the drive shafts 98. Accordingly, the ignition pins 92 are moved in the direction indicated by the arrow F in FIG. 2 by the urging forces of the compression springs 96 so as to collide with the detonators 62. As a result, the detonators 62 are ignited to produce sparks. The sparks are introduced into the explosion inducing agent 50 through the communicating passage 64. Thus, the explosion inducing agent 50 is burnt, so that the explosion inducing agent 38, with which the detonating tube 36 is filled, is ignited to produce heat. Thereafter, the gas generating materials 40 are burnt by the heat. As a result, a large quantity of gas is produced and passes through the gas holes 34 so as to flow into the bag 30, thereby expanding the bag 30. The bag 30 thus expanded unfolds the air bag cover 20 in the direction indicated by the arrow A in FIG. 3 so that it is interposed between the instrument panel 14 and the occupant seated on the assistant driver's seat, thereby making it possible to protect the occupant from impact occurring when the vehicle rapidly decelerates.

In the present embodiment, as described above, the lock plate 106 for activating and deactivating the starting equipment 54 is slid substantially parallel to the shaft portions 98A of the drive shafts 98 by the movement of the lock bolt 116 in the axial direction thereof. Further, when the lock plate 106 assumes the first position, the lock portions 108, 110 are brought into direct contact with the shaft portions 98A of the drive shafts 98 so as to prevent the drive shafts 98 from being rotated. Therefore, the force for drawing the lock plate 106 by the look bolt 116 can be reliably transmitted to each of the drive shafts 98 as it is.

Thus, the dimensional accuracy of the lock plate 106, the lock bolt 116, the lock bolt insertion portion 122, and the like, and the assembling accuracy of these members, the drive shafts 98 and the like can be made less severe.

In the present embodiment, as well, since the lock plate 106 and the lock bolt 116 are simply slid, space for securely disposing the safety device in the starting equipment 54 can be reduced as compared with a case in which a safety device activated by a combination of sliding and rotary motions is disposed within the starting equipment 54. If the safety device according to the present invention, which is used for the starting equipment, is adopted, then it is unnecessary to change the layout of the above respective components of the starting equipment 54, which are used to move (e.g., to move the balls 90 and the ignition pins 92 in the direction in which they intersect with each other) and rotate (e.g., to rotate the drive shafts 98 in the direction indicated by the arrow H in FIG. 4) the respective components in the direction in which they intersect with one another.

Incidentally, the present embodiment has shown, as an illustrative example, a case in which the air bag apparatus 10 for the P seat is of a type which is mounted on the assistant driver's seat. However, the present invention is not necessarily limited to the present embodiment. It is needless to say that the safety device according to the present invention may be applied to an air bag apparatus of a type which is mounted on a rear seat and/or a driver's seat.

Further, the present embodiment has shown a case in which the safety device according to the present invention is applied to the air bag apparatus. However, the present invention is not necessarily limited to this embodiment. The safety device may be applied to a so-called pre-load apparatus mounted on a webbing retractor for momentarily rotating a webbing take-up spindle in a webbing winding direction when the vehicle rapidly decelerates.

Having now fully described the invention, it will be apparent to those skilled in the art that many changes and modifications can be made without departing from the spirit or scope of the invention as set forth herein.

What is claimed is:

1. A safety device for preventing unexpected operation during installation of an ignition device wherein an inertial mass accommodated in a body is moved inertially when acceleration of a predetermined quantity or above is produced, and follow-up displacing means for displacing an ignition member toward a detonator is caused to follow up the inertial mass in a follow-up direction, said safety device comprising:

restricting means having at least one contact member which is linearly movable between a first position and a second position, said at least one contact member of said restricting means being brought into contact with said follow up displacing means when said restricting means is placed in said first position to inhibit said follow-up displacing means from being displaced in the follow-up direction, where said restricting means being released from being brought into contact with said follow-up displacing means when said restricting means is placed in said second position to enable said follow-up displacing means to move in the follow-up direction; and driving means having a tip end rotatably coupled to said restricting means, a tailing end and a threaded portion which is at least partially provided between said tip end and tailing end for displacing said restricting means in the direction to which said driving means is movable, thereby displacing said restricting means from said first position to said second position.

2. A safety device according to claim 1, wherein said restricting means has a plurality of contact members brought into contact with said follow-up displacing means, and guide members which guide linearly said driving means in the direction of said restricting means.

3. A safety device according to claim 1, wherein said body has a threaded hole, and said threaded portion of said driving means is rotatably engaged into said threaded hole of said body, and is rotated about its own axis thereof so as to be spirally moved, thereby displacing said restricting means from said first position to said second position.

4. A safety device according to claim 2, wherein said restricting means has a support member coupled to said contact members, said support member being coupled to said driving means and disposed so as to be movable in the direction in which said restricting means is displaced.

5. A safety device according to claim 4, wherein said support member has a through hole through which said driving means is rotatably coupled thereto.

6. A safety device according to claim 2, wherein said contact members of said restricting means and said guide members thereof are respectively provided so as to form substantially right angles with one another.

7. A safety device according to claim 2, wherein when said contact members of said restricting means retain and inactivate said follow-up displacing means in said first position, said contact members are each disposed in the first position via said follow-up displacing means in a position opposite to a position where said inertial mass is brought into contact with said follow-up displacing means.

8. A safety device according to claim 1, wherein said inertial mass, said ignition member, said follow-up displacing means and said restricting means are plurally provided, and assemblies of said inertial mass, said ignition member, said follow-up displacing means and said restricting means, each of which has been plurality provided, are respectively disposed symmetrically on one plane including an axis of said follow-up displacing means.

9. A safety device according to claim 2, further comprising rotation inhibition means defined in said body, said rotation inhibition means inhibiting said restricting means from being rotated in response to the rotation of said driving means owing to the insertion of said guide members of said restricting means into said rotation inhibition means.

10. A safety device according to claim 9, wherein said rotation inhibition means include slits defined in said body, for inserting said guide members therein in such a manner that said contact members of said restricting means are linearly movable between said first position and said second position.

11. A safety device according to claim 10, wherein said contact members of said restricting means and said guide members thereof are integrally formed of a plate material, and parts of said guide members of said restricting means are inserted into said slits respectively.

12. A safety device for preventing unexpected operation during installation of an ignition device wherein an inertial mass accommodated in a body is moved inertially when acceleration of a predetermined quantity or above is produced, and follow-up displacing means for displacing an ignition member toward a detonator is caused to follow up the inertial mass in a follow-up direction, said safety device comprising:
  restricting means including contact members brought into contact with said follow-up displacing means, and guide members having a free end respectively which is slidably supported in said body for preventing rotation and for moving linearly along a line segment connecting a first position and a second position, said guide members being provided at substantially right angles with said contact members, said contact members being disposed via said follow-up displacing means on the side opposite to said inertial mass so as to be brought into contact with said follow-up displacing means when said contact members are placed in said first position, thereby inhibiting said follow-up displacing means from being moved in the follow up direction, whereas said contact members being released from with said follow-up displacing means when said contact members are placed in said second position so as to enable said follow-up displacing means to move in the follow-up direction; and
  a shaft having a tip end rotatably coupled to said restricting means, tailing end and a threaded portion which is at least partially provided between said tip and tailing ends, for removing said restricting means from said first position to said second position, said shaft being linearly movable by an operator.

13. A safety device according to claim 12, wherein said restricting means has a support member coupled to said contact members, and said support member having a through hole centrally defined therein, said shaft being rotatably coupled to said support member so as to be movable in the direction in which said restricting means is displaced.

14. A safety device according to claim 12, wherein said shaft is rotated about the axis thereof so as to be spirally moved, thereby displacing said restricting means from said first position to said second position.

15. A safety device according to claim 12, further comprising slits defined in said body, for inhibiting said restricting means from being rotated in response to the rotation of said shaft owing to the insertion of said guide members of said restricting means into said slits, and said guide members being slidable in said slits so that said contact members are linearly displaced between said first position and said second position.

16. A safety device according to claim 12, wherein said inertial mass, said ignition member, said follow-up displacing means and said restricting means are respectively assembled in pairs, and the respective paired assemblies are disposed symmetrically on one plane including the axis of said shaft, said shaft being disposed between said paired restricting means so as to displace the same.

17. A safety device according to claim 15, wherein said contact members of said restricting means and said guide members thereof are integrally formed of plate materials, and parts of said guide members of said restricting means are inserted into said slits respectively.

18. A safety device according to claim 12, wherein said shaft has a screw formed on a longitudinally-extending intermediate portion of said shaft and threadedly engaged with said body.

19. A safety device for preventing unexpected operation during installation of an ignition device wherein an inertial mass accommodated in a body is moved inertially when acceleration of a predetermined quantity or above is produced, and follow-up displacing means for displacing an ignition member toward a detonator is caused to follow up the inertial mass, said safety device comprising:
  a lock plate being linearly moveable substantially parallel to said follow-up displacing means, and having contact portions brought into contact with said follow-up displacing means, guide portions formed at substantially right angles with said contact portions, and a support coupled to said contact portions and said support portion having a through hole defined therein, said contact portions, said guide portions and said support portion being united into a single member, and said contact portions being provided so as to be linearly movable between a first position and a second position, said contact portions of said lock plate being disposed via said follow-up displacing means on the side opposite to said inertial mass so as to be brought into contact with said follow-up displacing means when said contact portions are placed in said first position, thereby inhibiting said follow-up displacing means from being moved in a follow-up direction, whereas said contact portions being released from being brought into contact with said follow-up displacing means when said contact portions are placed in said second position, thereby enabling said follow-up displacing means to move in the follow-up direction;
  a presser shaft having a screw formed on an longitudinally-extending intermediate portion of said pressure shaft and threadedly engaged with said body, said presser shaft being brought into contact with said support portion of said lock plate so as to be rotated about an axis thereof, thereby displacing said lock plate from said first position to said second position; and
  slits defined in said body, for inhibiting said lock plate from being rotated in response to the rotation of said presser shaft owing to the insertion of said guide portions of said lock plate into said slits, said slits being defined therein in such a manner that said contact portions are slidable between said first position and said second position.

20. A safety device according to claim 19, wherein said inertial mass, said ignition member, said follow-up displacing means and said lock plate are respectively assembled in pairs, and the respective paired assemblies are disposed symmetrically on one plane including the axis of said shaft, said shaft being disposed between said paired lock plates so as to displace the same.

21. A safety device for preventing unexpected operation during installation of an ignition device wherein an inertial mass accommodated in a body is moved inertially when acceleration of a predetermined quantity or above is produced, and follow-up displacing means for displacing an ignition member toward a detonator is caused to follow up the inertial mass, said safety device comprising:

restricting means having at least one contact member, and being linearly movable between a first position and a second position, said contact member of said restricting means being brought into contact with said follow-up displacing means when said restricting means is placed in said first position to inhibit said follow-up displacing means from being displaced in the follow-up direction, where said restricting means being released from being brought into contact with said follow-up displacing means when said restricting means is placed in said second position to enable said follow up displacing means to move in the follow-up direction; and driving means being linearly movable and rotatably coupled to said restricting means for displacing said restricting means in the direction to which said driving means is linearly moved, thereby displacing said restricting means from said first position to said second position.

* * * * *